United States Patent [19]

Kauth et al.

[11] Patent Number: 4,782,123

[45] Date of Patent: Nov. 1, 1988

[54] PROCESS FOR THE PREPARATION OF COPOLYPHOSPHONATES OF HIGH NOTCHED IMPACT STRENGTH

[75] Inventors: Hermann Kauth, Krefeld; Klaus Reinking, Wermelskirchen; Dieter Freitag, Krefeld, all of Fed. Rep. of Germany

[73] Assignee: Bayer Aktiengesellschaft, Leverkusen, Fed. Rep. of Germany

[21] Appl. No.: 118,538

[22] Filed: Nov. 9, 1987

Related U.S. Application Data

[63] Continuation of Ser. No. 858,707, May 2, 1986, abandoned.

[30] Foreign Application Priority Data

May 14, 1985 [DE] Fed. Rep. of Germany ....... 3517271

[51] Int. Cl.$^4$ .................. C08L 67/02; C08L 69/00
[52] U.S. Cl. ................................. 525/437; 525/462; 525/538
[58] Field of Search ................. 525/437, 462, 538

[56] References Cited

U.S. PATENT DOCUMENTS

| | | | |
|---|---|---|---|
| 3,326,852 | 6/1967 | Thomas | 525/437 |
| 3,829,405 | 8/1974 | Cohen | 525/437 |
| 4,028,330 | 6/1977 | King | 525/437 |
| 4,223,104 | 9/1980 | Kim | 528/169 |
| 4,328,174 | 5/1982 | Schmidt et al. | 528/167 |
| 4,332,921 | 6/1982 | Schmidt et al. | 525/462 |
| 4,481,338 | 11/1984 | Serini et al. | 525/394 |

FOREIGN PATENT DOCUMENTS

| | | |
|---|---|---|
| 0021213 | 6/1980 | European Pat. Off. |
| 0034697 | 1/1981 | European Pat. Off. |
| 0103231 | 8/1983 | European Pat. Off. |

*Primary Examiner*—Patricia Short
*Attorney, Agent, or Firm*—Connolly and Hutz

[57] ABSTRACT

Extrusion of solutions of aromatic polyesters and aromatic polyphosphonates gives copolyphosphonates with improved notched impact strength.

10 Claims, No Drawings

PROCESS FOR THE PREPARATION OF COPOLYPHOSPHONATES OF HIGH NOTCHED IMPACT STRENGTH

This is a continuation of application Ser. No. 858,707, filed May 2, 1986, now abandoned.

The invention relates to a process for the preparation of aromatic copolyphosphonates with improved notched impact strength by evaporation of solutions of aromatic polyphosphonates and aromatic polyesters in organic solvents. The term "aromatic polyesters" in the context of the invention includes aromatic polycarbonates and consequently also aromatic polyester-carbonates and mixtures of aromatic polyesters and aromatic polycarbonates.

Aromatic polyester-phosphonates and aromatic polycarbonatophosphonates are known (DE-AS (German Published Specification) Nos. 1,199,499 and 1,199,500). They are predominantly prepared by the phase boundary process from bisphenolate, phosphonic acid dichlorides and dicarboxylic acid dichlorides or from bisphenol-bischlorocarbonic acid esters (or the starting products thereof, bisphenol and phosgene) and phosphonic acid dichlorides. Because the use of phosphonic acid dichlorides in the phase boundary process easily gives rise to the formation of emulsions, phase separation of which is difficult or even impossible, this preparation process has not been able to find acceptance in practice.

Polyester-phosphonates and polycarbonatophosphonates can also be prepared by melt condensation from bisphenol, phosphonic acid esters and carboxylic acid esters or from bisphenol, phosphonic acid esters and diphenyl carbonate (compare, for example, DE-OS (German Published Specification) Nos. 2,925,206 and 2,925,208). They have a high heat distortion point but do not meet very high requirements in respect of notched impact strength.

Surprisingly, it has been found that extrusion of solutions of aromatic polyesters and aromatic polyphosphonates at elevated temperature give copolyphosphonates, the notched impact strengths of which are superior to those of the copolyphosphonates prepared by melt condensation and frequently even to those of both starting components, the absolute values of course varying as a function of the number of ester and carbonate groups.

The invention thus relates to a process for the preparation of aromatic copolyphosphonates with average molecular weights $\overline{M}_n$ of 5,000 to 200,000, preferably 10,000 to 150,000 and molar phosphonate groups/(carboxylate plus carbonate groups) ratios of 95:5 to 5:95, preferably 80:20 to 10:90 and in particular 65:35 to 10:90, characterized in that a mixture of I. aromatic polyester and II. aromatic polyphosphonate, in the desired ratio, and III. organic solvent, in an amount of 2 to 95, preferably 30 to 80 and in particular 60 to 75, % by weight, based on the sum of components I+II+III, is extruded at temperatures of 150° to 420°, preferably 200° to 380° and in particular 300° to 380° C., up to a degree of transesterification (determined by the ratio of the glass transition temperature peaks according to differential thermal analysis) of at least 80, preferably at least 90 and in particular at least 95, %, the solvent being removed during the extrusion, if appropriate under reduced pressure.

As a rule, a procedure is followed in which the reaction mixture is heated to a temperature of 150° to 260° C., preferably 200° to 260° C., and the temperature is gradually increased to a temperature of 280° to 420° C., preferably 300° to 380° C., while maintaining the liquid state of the mixture.

The mixture intended for the extrusion is as a rule prepared by mixing dilute solutions of components I and II and by subsequently concentrating in an upstream evaporation stage.

The process according to the invention can be carried out by a procedure in which the temperature is increased and the pressure is reduced - continuously or stepwise. The residual solvent is preferably removed in an extruder zone with devolatilization vents, in general under reduced pressure. The residence time in this last extruder zone is preferably 20 to 350 seconds, and the temperature in this zone is preferably 300° to 380° C.

As the reaction time is increased, the notched impact strength is reduced, which is at least partly to be attributed to the reduction in molecular weight; the reaction will accordingly then be discontinued at the latest when transesterification to the extent of 100% has occurred.

The glass transition temperature can be determined, for example, by differential thermal analysis on films cast from solution. The transparency of the extruded strand is also an indication of complete transesterification.

Examples of organic solvents III which are preferred for the process according to the invention are methylene chloride, chloroform, tetrachloroethanes, trichloroethylene, tetrachloroethylene, chlorobenzene, dichlorobenzene, toluene, xylene, anisole or mixtures thereof.

Aromatic polyesters I include
(a) completely aromatic polyesters,
(b) aromatic polycarbonates,
(c) aromatic polyester-carbonates and mixtures thereof.

Completely aromatic polyesters (a) in the context of the invention are polyesters containing iso- and/or terephthalic acid radicals, halogen-free diphenol radicals and radicals of chain stoppers and, if appropriate, of branching agents, with relative viscosities of 1.18 to 2.0, preferably 1.2 to 1.7 (measured on a solution of 0.5 g of polyester in 100 ml of methylene chloride solution at 25° C.). They are described, for example, in the monograph "Polyesters" by V. V. Korshak and S. V. Vinogradova, Pergamon Press, Oxford 1965, pages 494, 485–486, 454–455.

Preferred halogen-free diphenols for the preperation of the completely aromatic polyesters (a) are compounds of the formula

HO—Z—OH     (I)

wherein Z denotes a divalent mono- or polynuclear aromatic radical with 6–30 C atoms, Z being built up such that the two OH groups are bonded directly to in each case one C atom of an aromatic system.

Particularly preferred diphenols are compounds of the formula

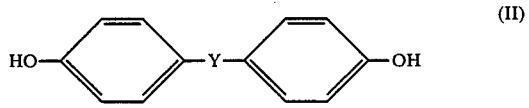

(II)

in which Y denotes a single bond, an alkylene or alkylidene radical with 1-7 C atoms, a cycloalkylene or cycloalkylidene radical with 5-12 C atoms, —O—, —S—,

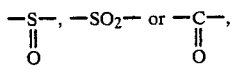

and nuclear-alkylated derivatives thereof, for example hydroquinone, resorcinol, dihydroxydiphenyls, bis-(hydroxyphenyl)-alkanes, bis-(hydroxyphenyl)-cycloalkanes, bis(hydroxyphenyl) sulphides, bis-(hydroxyphenyl) ethers, bis-(hydroxyphenyl) ketones, bis-(hydroxyphenyl) sulphoxides, bis-(hydroxyphenyl) sulphones and α,α'-bis-(hydroxyphenyl)-diisopropylbenzenes, and nuclear-alkylated compounds thereof, and mixtures of such diphenols.

The most important diphenols are listed below: bisphenol A, 2,2-bis-(3-methyl-4-hydroxyphenyl)-propane, 2,2-bis-(3,5-dimethyl-4-hydroxyphenyl)-propane, 1,1-bis-(4-hydroxyphenyl)-isobutane, 2,4-biS-(4-hydroxyphenyl)-2-methylbutane, 1,1-bis-(4-hydroxyphenyl)-cyclohexane, 4,4'-dihydroxydiphenyl sulphide, 4,4'-dihydroxydiphenyl, 4,4'-dihydroxydiphenyl sulphone and α,α'-bis-(4-hydroxyphenyl)-p-diisopropylbenzene, and mixtures thereof.

Preferred completely aromatic polyesters (a) obtain iso- and terephthalic acid radicals in a ratio of 7:3 to 3:7, preferably about 1:1.

Aromatic polycarbonates (b) in the context of the invention are halogen-free homo- and copolycarbonates based on the diphenols I or II, phosgene, chain stoppers and, if appropriate, branching agents and with a molecular weight $\overline{M}_w$, determined as the weight average, of 10,000 to 200,000, preferably 20,000 to 80,000, determined by light scattering.

Aromatic polyester-carbonates (c) in the context of the invention contain iso- and/or terephthalic acid radicals, carbonate groups, halogen-free radicals of the diphenols of the general formula (I) or (II) and radicals of chain stoppers and, if appropriate, branching agents. These polyester-carbonates (c) and their preparation are described, for example, by C. P. Bosnyak et al. in the journal "Polymer" 1982, volume 23, pages 609–612, "Synthesis and Properties of some Poly(bisphenolA-iso/terephthalate)-copolycarbonates" and in DE-AS (German Published Specification) No. 1,495,302, European Patent No. A-64,153 and in U.S. Pat. No. 4,286,083.

Preferred aromatic polyester-carbonates (c) have a molecular weight $\overline{M}_w$, determined as the weight-average, of 10,000 to 200,000, preferably 20,000 to 80,000, determined by light scattering.

The polyester-carbonatophosphonates to be prepared by the process according to the invention preferably contain carboxylate and carbonate groups in a molar ratio of 23:77 to 100:0.

Aromatic polyphosphonates II in the context of the invention are thermoplastic compounds with molecular weights, determined as the numerical average, of 5,000 to 200,000, preferably 6,000 to 80,000 and in particular 8,000 to 40,000, containing recurring units of the formula

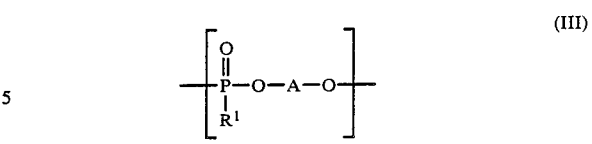

(III)

wherein $R^1$ denotes $C_1$–$C_{12}$-alkyl (preferably methyl), $C_2$–$C_{12}$-alkenyl or $C_6$–$C_{30}$-cycloalkyl, -cycloalkenyl, -aryl (preferably phenyl), -arylalkyl or -arylalkenyl, the particular aryl group being unsubstituted or substituted by 1–5 $C_1$–$C_4$-alkyl groups or by 1–5 halogen atoms (F, Cl or Br) or by the alkyl groups and halogen atoms mentioned, and

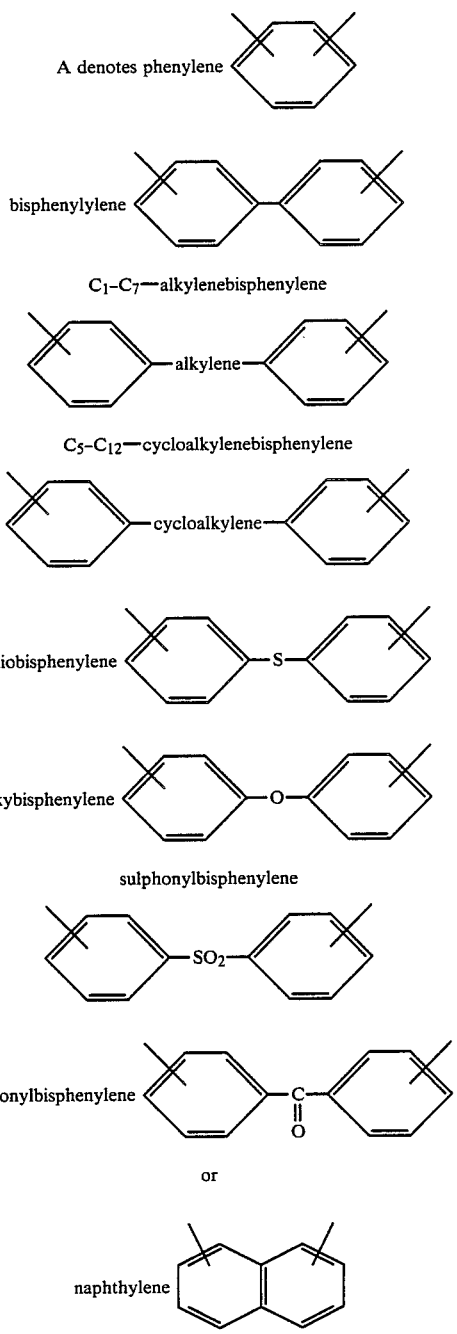

each phenyl nucleus being unsubstituted or substituted by 1-4 $C_1$-$C_4$-alkyl groups or by 1-4 halogen atoms (F, Cl or Br) or by the alkyl groups and halogen atoms mentioned, and the naphthyl nucleus being unsubstituted or substituted by 1-6 of at least one of the groups or atoms mentioned.

The aromatic polyphosphonates II can be branched, preferably not more than 3 mol %, based on the monomer unit III, of branching agent being employed.

Suitable branching agents are compounds which are trifunctional or more than trifunctional and which can be cocondensed into the polyphosphonates. A preferred branching agent is trimesic acid.

It should be remembered that when (carboxylate group-free) polycarbonate is employed, the notched impact strength decreases as the polycarbonate content increases from a molar carbonate/phosphonate ratio of 30:70.

The copolyphosphonates prepared according to the invention are chiefly used for the preparation of shaped articles which should have a high notched impact strength, for example sockets for plugs, lamp holders and switch boxes.

Processing is as a rule by injection moulding at melt temperatures of 280° to 360° C. and mould temperatures of 80° to 150° C., preferably 90° to 120° C.

EXAMPLES

The aromatic polyester "APE" employed in the following examples in the form of its 10% strength by weight solution in methylene chloride/chlorobenzene (weight ratio 1:1) is a polyester of bisphenol A, and iso- and terephthalic acid radicals (molar ratio of iso-/terephthalic acid radicals=1/1) with p-tert.-butylphenol end groups and with a relative solution viscosity $\eta_{rel}$=1.30, measured in 0.5% strength by weight solution in methylene chloride at 25° C.

The polycarbonate "PC" employed in the following examples in the form of its 10% strength by weight solution in methylene chloride/chlorobenzene (weight ratio 1:1) is a polycarbonate of bisphenol A, phosgene and p-tert.-butyl-phenol, as the chain stopper, with a relative solution viscosity $\eta_{rel}$=1.28, measured in 0.5% strength by weight solution in methylene chloride at 25° C.

The polyester-carbonates "APE-Z" employed in the following examples in the form of their 10% strength by weight solution in methylene chloride/chlorobenzene (weight ratio 1:1) are built up from bisphenol A, iso- and terephthalic acid (molar ratio 1:1) and phosgene and have relative solution viscosities $\eta_{rel}$=1.28-1.30, measured in 0.5 % strength by weight solution in methylene chloride at 25° C. The "Z" designates the content of iso- and terephthalate units in the polyester-carbonate, expressed in % by weight.

The polyphosphonate "POP" employed in the following examples in the form of its 10% strength by weight solution in methylene chloride/chlorobenzene (weight ratio 1:1) is built up on the basis of methanephosphonic acid and 4,4'-dihydroxydiphenyl and has a relative solution viscosity of $\eta_{rel}$=1.23, measured in 0.5% strength by weight solution in methylene chloride at 25° C.

The notched impact strength $a_k$ was tested by the method of Charpy in accordance with DIN 53 453.

The 10% strength solution of "POP" was mixed with the 10% strength solution of "APE", "APE-Z" or "PC" and the mixture was evaporated to a solids content of about 30% by weight and freed from the solvent on a twin-screw devolatilization extruder. The temperature in the vacuum extruder was 340° C.; the residence time was about 250 seconds.

The standard small bars were produced on an injection-moulding machine at a melt temperature of 330° C. and a mould temperature of 95° C.

| Example | POP | APE | APE 80 | APE 50 | APE 30 | PC | $\eta_{rel}$ | $a_k[kJ/m^2]$ |
|---|---|---|---|---|---|---|---|---|
| 1 | 10 | 90 | | | | | 1.275 | 30 |
| 2 | 30 | 70 | | | | | 1.282 | 31 |
| 3 | 50 | 50 | | | | | 1.265 | 37 |
| 4 | 90 | 10 | | | | | 1.209 | 49.5 |
| 5 | 10 | | 90 | | | | 1.284 | 37 |
| 6 | 20 | | 80 | | | | 1.254 | 33 |
| 7 | 50 | | 50 | | | | 1.286 | 38 |
| 8 | 90 | | 10 | | | | 1.201 | 43 |
| 9 | 20 | | | 80 | | | 1.252 | 35 |
| 10 | 50 | | | 50 | | | 1.240 | 38 |
| 11 | 90 | | | 10 | | | 1.213 | 40 |
| 12 | 10 | | | | 90 | | 1.276 | 48 |
| 13 | 20 | | | | 80 | | 1.260 | 44 |
| 14 | 30 | | | | 70 | | 1.249 | 42 |
| 15 | 50 | | | | 50 | | 1.253 | 52 |
| 16 | 80 | | | | 20 | | 1.242 | 42 |
| 17 | 90 | | | | 10 | | 1.210 | 43 |
| 18 | 70 | | | | | 30 | 1.227 | 35 |
| 19 | 80 | | | | | 20 | 1.215 | 40 |
| 20 | 90 | | | | | 10 | 1.207 | 48 |
| 21 | 100 | | | | | | 1.230 | 32 |
| 22 | | 100 | | | | | 1.301 | 25 |
| 23 | | | 100 | | | | 1.285 | 28 |
| 24 | | | | 100 | | | 1.297 | 32 |
| 25 | | | | | 100 | | 1.294 | 35 |
| 26 | | | | | | 100 | 1.281 | 50 |

All the products were transparent and had only a single glass transition temperature.

We claim:

1. Process for the preparation of aromatic copolyphosphonates with average molecular weights $M_n$ of 5,000 to 200,000 and molar ratios of phosphonate groups to carboxylate plus carbonate groups of 95:5 to 5:95, which comprises transesterifying
   I. aromatic polyester and
   II. aromatic polyphosphonate, in
   III. organic solvent, in an amount of 2 to 95% by weight, based on the sum of components I, II and III, by extruding the mixture at temperatures of 150° to 420° C., until at least 80% transesterification, as determined by the ratio of the glass transition temperature peaks according to differential thermal analysis, is achieved with the solvent being removed during the extrusion.

2. Process according to claim 1, characterized in that the average molecular weight $\overline{M}_n$ of the copolyphosphonates is 10,000 to 150,000.

3. Process according to claim 1, characterized in that the molar phosphonate groups/(carboxylate plus carbonate groups) ratio is 80:20 to 10:90.

4. Process according to claim 1, characterized in that the molar phosphonate groups/(carboxylate plus carbonate groups) ratio is 65:35 to 10:90.

5. Process according to claim 1, characterized in that the organic solvent III is employed in an amount of 30 to 80% by weight, based on the sum of components I+II+III.

6. Process according to claim 1, characterized in that the organic solvent III is employed in an amount of 60 to 75% by weight, based on the sum of components I+II+III.

7. Process according to claim 1, characterized in that the temperature is 200° to 380° C.

8. Process according to claim 1, characterized in that the temperature is 280° to 360° C.

9. Process according to claim 1, characterized in that the degree of transesterification is at least 90%.

10. Process according to claim 1, characterized in that the degree of transesterification is at least 95%.

* * * * *